(12) United States Patent
Kirillov (10) Patent No.: US 11,892,634 B2
(45) Date of Patent: Feb. 6, 2024

(54) MULTI-PLANE PROJECTION WITH LASER BEAM SCANNING IN AUGMENTED REALITY DISPLAYS

(71) Applicant: Infineon Technologies AG, Neubiberg (DE)

(72) Inventor: Boris Kirillov, Judendorf-Straßenge (AT)

(73) Assignee: Infineon Technologies AG, Neubiberg (DE)

( * ) Notice: Subject to any disclaimer, the term of this patent is extended or adjusted under 35 U.S.C. 154(b) by 330 days.

(21) Appl. No.: 17/162,090

(22) Filed: Jan. 29, 2021

(65) Prior Publication Data

US 2022/0244535 A1 Aug. 4, 2022

(51) Int. Cl.
| | | |
|---|---|---|
| *G02B 27/01* | (2006.01) | |
| *G02B 26/08* | (2006.01) | |
| *G02B 26/10* | (2006.01) | |
| *G02B 27/28* | (2006.01) | |

(52) U.S. Cl.
CPC ..... *G02B 27/0172* (2013.01); *G02B 26/0833* (2013.01); *G02B 26/101* (2013.01); *G02B 27/283* (2013.01); *G02B 2027/0114* (2013.01); *G02B 2027/0178* (2013.01)

(58) Field of Classification Search
CPC ............ G02B 27/0172; G02B 26/0833; G02B 26/101; G02B 27/283; G02B 2027/0114

USPC ......................................................... 359/204
See application file for complete search history.

(56) References Cited

U.S. PATENT DOCUMENTS

| | | | |
|---|---|---|---|
| 7,184,103 B2* | 2/2007 | Lee ...................... | H04N 9/3129 |
| | | | 348/E9.026 |
| 2016/0187654 A1* | 6/2016 | Border ............... | G02B 27/0172 |
| | | | 359/630 |
| 2017/0090275 A1* | 3/2017 | Sugiyama ............ | H04N 9/3129 |
| 2021/0173480 A1* | 6/2021 | Osterhout ............ | G06F 3/0227 |

* cited by examiner

*Primary Examiner* — Joseph P Martinez
*Assistant Examiner* — Grant A Gagnon
(74) *Attorney, Agent, or Firm* — Harrity & Harrity, LLP (57) ABSTRACT

An image projection system includes a first transmitter configured to generate first light beams; a first collimation lens configured to receive the first light beams and generate first collimated light beams to be projected onto an eye to render a first projection image perceived at a first projection plane; a second transmitter configured to generate second light beams; a second collimation lens configured to receive the second light beams and generate second collimated light beams to be projected onto the eye to render a second projection image perceived at a second projection plane; a first beam combiner configured to transmit the first and the second collimated light beams on a combined transmission path; and a scanner configured to steer the first and the second collimated light beams according to a scanning pattern to render the first projection image and the second projection image onto the eye.

32 Claims, 6 Drawing Sheets

MULTI-PLANE PROJECTION WITH LASER BEAM SCANNING IN AUGMENTED REALITY DISPLAYS

BACKGROUND

Augmented reality (AR) is a technology that augments physical environments on a mobile device screen by overlaying them with digital content. It adds digital elements to a live view. For example, a captured piece of an environment is augmented with digital information that is superimposed thereon. Thus, digital content is overlaid onto the captured piece of the environment to visually provide additional information to a user. The digital content may be displayed on a transparent substrate or display, such as smart eyeglasses, smart contact lenses, head-up displays (HUDs), and head-mounted displays (HMDs), or projected directly onto a user's retina, as is the case for virtual retinal displays.

Virtual reality (VR) is a technology that entirely replaces the real world environment of a user with a computer-generated virtual environment. Thus, a user is presented with a completely digital environment. In particular, computer-generated stereo visuals entirely surround the user. In a VR simulated environment, a VR headset that provides 360 degree vision may be used.

A mixed reality (MR) experience combines elements of both AR and VR such that real-world and digital objects interact. Here, a real world environment is blended with a virtual one.

These technologies, as well as others that enhance a user's senses, may be referred to as extended reality (XR) technologies. An existing issue with XR technologies occurs when there is a vergence-accommodation conflict. The type of conflict occurs when the eye accommodation is not in alignment with the eye-vergence in stereo projection displays. This can cause a user to feel sick or nauseous. Another existing issue with XR technologies is referred to as focal rivalry where a virtual object competes with a real object for focal attention. Focal rivalry can cause object to be out of focus and can further cause eye strain and user fatigue due to frequent eye refocusing. To avoid this, seamless virtual object insertion should be done at a correct virtual distance to avoid eye refocusing when jumping from real to virtual objects. However, current systems are limited in that they require bulky projection lens and are subject to time-division multiplexing—meaning they cannot project multiple objects simultaneously at different virtual distances or multiple virtual planes (i.e., only one virtual distance can be projected to at a time).

In order to enhance a user experience in an XR technology and address one or more of the above issues, it may be beneficial to implement a multi-plane projection with laser beam scanning.

SUMMARY

One or more embodiments provide an image projection system that includes a first transmitter configured to generate first light beams corresponding to a first projection plane and transmit the first light beams along a first transmission path; a first collimation lens arranged on the first transmission path, the first collimation lens configured to receive the first light beams and generate first collimated light beams to be projected onto an eye to render a first projection image perceived at the first projection plane; a second transmitter configured to generate second light beams corresponding to a second projection plane different from the first projection plane and transmit the second light beams along a second transmission path; a second collimation lens arranged on the second transmission path, the second collimation lens configured to receive the second light beams and generate second collimated light beams to be projected onto the eye to render a second projection image perceived at the second projection plane; a first beam combiner arranged at an intersection of the first transmission path and the second transmission path, the first beam combiner configured to transmit the first collimated light beams and the second collimated light beams on a combined transmission path; and a scanner arranged on the combined transmission path, the scanner configured to receive the first collimated light beams and the second collimated light beams, and steer the first collimated light beams and the second collimated light beams according to a scanning pattern to render the first projection image and the second projection image onto the eye.

One or more embodiments provide an image projection system that includes a transmitter configured to generate first light beams corresponding to a first projection plane, generate second light beams corresponding to a second projection plane, and sequentially transmit the first light beams and the second along a transmission path; a movable collimation lens arranged on the transmission path and is configured to move axially relative to the transmitter such that a minimum axial distance from the transmitter changes, wherein the movable collimation lens is configured to receive the first light beams when at a first minimum axial distance from the transmitter, generate first collimated light beams to be projected onto an eye to render a first projection image perceived at the first projection plane, receive the second light beams when at a second minimum axial distance from the transmitter different from the first minimum axial distance, and generate second collimated light beams to be projected onto the eye to render a second projection image perceived at the second projection plane different from the first projection plane; and a scanner arranged on the transmission path, the scanner configured to receive the first collimated light beams and the second collimated light beams, and steer the first collimated light beams and the second collimated light beams according to at least one scanning pattern to render the first projection image and the second projection image onto the eye.

One or more embodiments provide an image projection system that includes a transmitter configured to generate first light beams corresponding to a first projection plane, generate second light beams corresponding to a second projection plane, and sequentially transmit the first light beams and the second along a transmission path; a collimation lens arranged on the transmission path, the first collimation lens configured to receive the first light beams, transmit the first light beams as first collimated light beams, receive the second light beams, and transmit the second light beams as second collimated light beams; an adjustable optical element arranged on the transmission path and configured to adjust its focal length to include at least a first focal length corresponding to the first projection plane and a second focal length corresponding to the second projection plane, wherein the adjustable optical element is configured to receive the first collimated light beams when its focal length is set at the first focal length and transmit the first collimated light beams as first compensated light beams to be projected onto an eye to render a first projection image perceived at the first projection plane, and wherein the adjustable optical element is configured to receive the second collimated light beams when its focal length is set at the second focal length and transmit the second collimated light beams as second compensated light beams to be projected onto the eye to render a second projection image perceived at the second projection plane different from the first projection plane; and a scanner arranged on the transmission path, the scanner configured to receive the first compensated light beams and the second compensated light beams, and steer the first compensated light beams and the second compensated light beams according to at least one scanning pattern to render the first projection image and the second projection image onto the eye.

One or more embodiments provide an image projection system that includes a first plurality of monochromatic transmitters configured to transmit first polarized light beams corresponding to a first projection plane; a first plurality of collimation lenses corresponding to the first plurality of monochromatic transmitters, wherein each of the first plurality of collimation lenses is configured to receive a first polarized light beam from a different one of the first plurality of monochromatic transmitters such that the first plurality of collimation lenses generate first polarized collimated light beams to be projected onto an eye to render a first projection image perceived at the first projection plane; a second plurality of monochromatic transmitters configured to transmit second polarized light beams corresponding to a second projection plane; a second plurality of collimation lenses corresponding to the second plurality of monochromatic transmitters, wherein each of the second plurality of collimation lenses is configured to receive a second polarized light beam from a different one of the second plurality of monochromatic transmitters such that the second plurality of collimation lenses generate second polarized collimated light beams to be projected onto the eye to render a second projection image perceived at the second projection plane; a polarizing beam combiner arranged at an intersection of the first polarized collimated light beams and the second polarized collimated light beams to direct the first polarized collimated light beams and the second polarized collimated light beams on a combined transmission path; and a scanner arranged on the combined transmission path, the scanner configured to receive the first polarized collimated light beams and the second polarized collimated light beams, and steer the first polarized collimated light beams and the second polarized collimated light beams according to a scanning pattern to render the first projection image and the second projection image onto the eye.

One or more embodiments provide an image projection system that includes a first plurality of monochromatic transmitters configured to transmit a first plurality of light beams corresponding to a plurality of projection planes that are perceived at different distances; a first plurality of collimation lenses corresponding to the first plurality of monochromatic transmitters, wherein each of the first plurality of collimation lenses is configured to receive a corresponding light beam from a different one of the first plurality of monochromatic transmitters such that the first plurality of collimation lenses generate a first plurality of collimated light beams to be projected onto an eye to render a plurality of projection images, each to be perceived at a different one of plurality of projection planes; and a scanner configured to receive the first plurality of collimated light beams and steer the first plurality of collimated light beams according to a scanning pattern to render the plurality of projection images onto the eye.

BRIEF DESCRIPTION OF THE DRAWINGS

Embodiments are described herein making reference to the appended drawings.

DETAILED DESCRIPTION

In the following, various embodiments will be described in detail referring to the attached drawings. It should be noted that these embodiments serve illustrative purposes only and are not to be construed as limiting. For example, while embodiments may be described as comprising a plurality of features or elements, this is not to be construed as indicating that all these features or elements are needed for implementing embodiments. Instead, in other embodiments, some of the features or elements may be omitted, or may be replaced by alternative features or elements. Additionally, further features or elements in addition to the ones explicitly shown and described may be provided, for example conventional components of sensor devices.

Features from different embodiments may be combined to form further embodiments, unless specifically noted otherwise. Variations or modifications described with respect to one of the embodiments may also be applicable to other embodiments. In some instances, well-known structures and devices are shown in block diagram form rather than in detail in order to avoid obscuring the embodiments.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

Connections or couplings between elements shown in the drawings or described herein may be wire-based connections or wireless connections unless noted otherwise. Furthermore, such connections or couplings may be direct connections or couplings without additional intervening elements or indirect connections or couplings with one or more additional intervening elements, as long as the general purpose of the connection or coupling, for example to transmit a certain kind of signal or to transmit a certain kind of information, is essentially maintained.

The term "substantially" may be used herein to account for small manufacturing tolerances (e.g., within 5%) that are deemed acceptable in the industry without departing from the aspects of the embodiments described herein.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

Embodiments relate to optical sensors and optical sensor systems and to obtaining information about optical sensors and optical sensor systems. A sensor may refer to a component which converts a physical quantity to be measured to an electric signal, for example a current signal or a voltage signal. The physical quantity may, for example, comprise electromagnetic radiation, such as visible light (VL), infrared (IR) radiation, or other type of illumination signal, a current, or a voltage, but is not limited thereto. For example, an image sensor may be a silicon chip inside a camera that converts photons of light coming from a lens into voltages. The larger the active area of the sensor, the more light that can be collected to create an image.

A sensor device as used herein may refer to a device which comprises a sensor and further components, for example biasing circuitry, an analog-to-digital converter or a filter. A sensor device may be integrated on a single chip, although in other embodiments a plurality of chips or also components external to a chip may be used for implementing a sensor device.

In the field of extended reality (XR) technologies, a sensor may be used for eye-tracking to detect and track a direction in which a user is looking. Doing so may allow the XR system to use foveated rendering, a technique that shifts a high-detailed region of an image to coincide with a projection onto the fovea. Dynamic foveated rendering follows the user's focal direction (i.e., a user's gaze) in real-time using eye-tracking or gaze-tracking and renders a sharp image wherever the user's retinas are looking rather than at any fixed location. Embodiments disclosed herein are directed to detecting and tracking an eye direction (i.e., a focal direction), and, more particularly, to detection and tracking a fovea position of a user's eye in order to compensate a scanning operation of a scanning system. Based on the detected focal direction and/or the detected fovea position, a system controller is configured to adjust one or more system parameters, including: a scanning frequency of a scanning structure, a scanning pattern, a light pulse emission time of an red-green-blue (RGB) projection, and/or a beam width of an RGB projection.

Figure 1A:
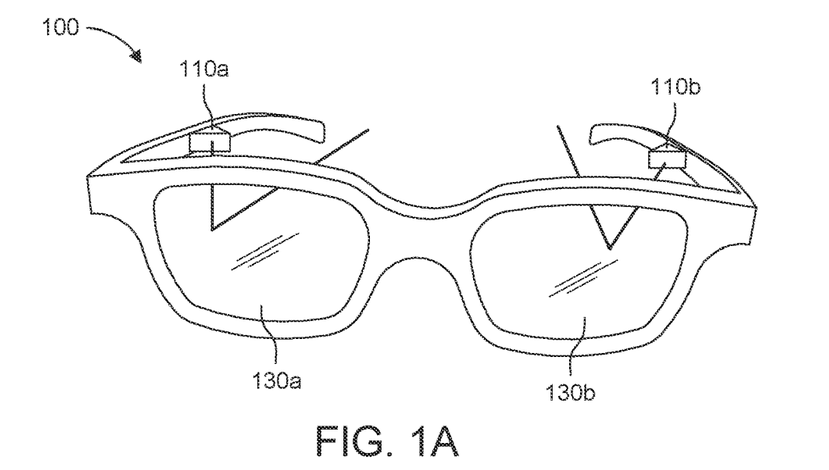
FIG. 1A is a diagram of an image projection system 100 in accordance with one or more embodiments.

FIG. 1A is a diagram of an image projection system 100 in accordance with one or more embodiments. The image projection system 100 comprises at least one projection module that projects images in one or more (virtual) projection planes according to a scanning pattern. In particular, visible light (VL) projections, such as red-green-blue (RGB) projections, are projected onto an eye according to preprogrammed scanning pattern (e.g., a raster or a Lissajous pattern), where RGB light pulses track the pattern.

A projection module may be provided for each eye for projecting stereo images comprising a left-eye image and a right-eye image. Thus, in this example, two projection modules 110a and 110b are provided. The image projection system 100 itself may be eyeglasses, but may be any other XR projection system (e.g., HUD, HMD, etc.). The eyeglasses include a combiner glass 130a, 130b (e.g., eyeglass lenses) for each projection module 110a, 110b, respectively, that receives transmitted light beams from a corresponding projection module 110a, 110b and projects (e.g., deflects) the light beams onto a corresponding eye according to a virtual projection plane that corresponds to virtual distance at which the images are to be perceived.

Figure 1B:
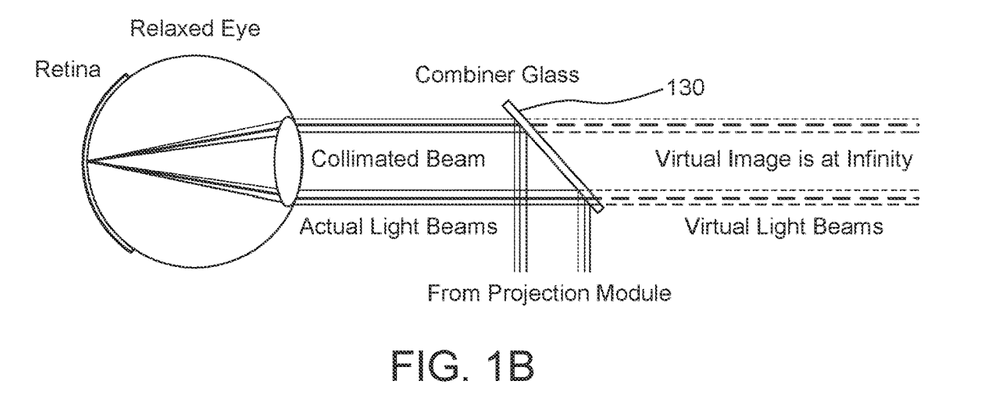
FIG. 1B illustrates an image projection onto an eye in accordance with one or more embodiments where the virtual image is projected at optical infinity.
Figure 1C:
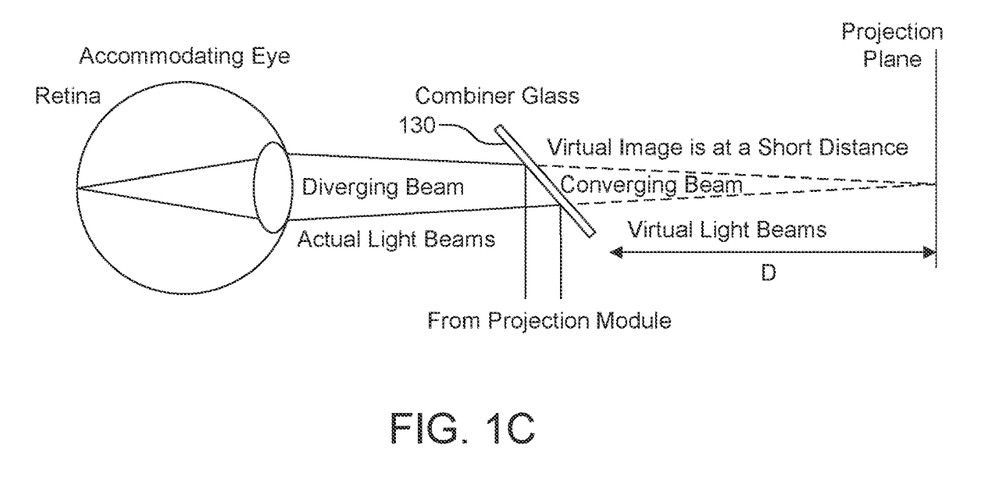
FIG. 1C illustrates an image projection onto an eye in accordance with one or more embodiments where the virtual image is projected at a short distance D that is less than optical infinity.

FIG. 1B illustrates an image projection onto an eye in accordance with one or more embodiments where the virtual image is projected at optical infinity. FIG. 1C illustrates an image projection onto an eye in accordance with one or more embodiments where the virtual image is projected at a short distance D that is less than optical infinity. Here, the term "optical infinity" or "infinity focus" is the state where a lens or other optical system forms an image of an object an infinite distance away. This corresponds to the point of focus for parallel light beams. In other words, light rays originating from a selected point of a virtual image are transmitted in parallel to each other such that the virtual image is perceived by an eye at an infinite distance away. When an optical system (e.g., a human eye) is looking at the optical infinity, it is forming the image exactly at the focal plane of the optical system. A relaxed (normal 20/20 vision) human eye is creating the image of optical infinity at the retina making a distant object to appear sharp. It can be said that the (virtual) projection plane at which the virtual image is perceived to be rendered is located at an infinite distance, as is shown in FIG. 1B. Both actual (real) light beams and virtual light beams extended from combiner glass 130 are transmitted as parallel beams of light. Virtual light beams are virtual extensions of the actual light beams that render a virtual image in virtual space at the virtual projection plane. A projected distance of 9.5 meters is equivalent to optical infinity from an effort perspective and an image projected at 9.5 meters covers an eye accommodation from 5 meters to infinity.

In contrast, diverging light beams result in an image being perceived at a shorter distance. As can be seen in FIG. 1C, actual light beams transmitted from the combiner glass 130 towards the eye are diverging beams and virtual light beams extend outward from the combiner glass 130 away from the eye as converging beams. The virtual light beams converge at a projection plane at which the image is to be perceived. This projection plane is perceived at a distance D from the combiner glass 130, resulting in the image being perceived at that distance. When an image is projected at optical infinity, the eye is said to be relaxed. When an image is projected at a shorter distance, the eye is said to be accommodating.

Figure 2:
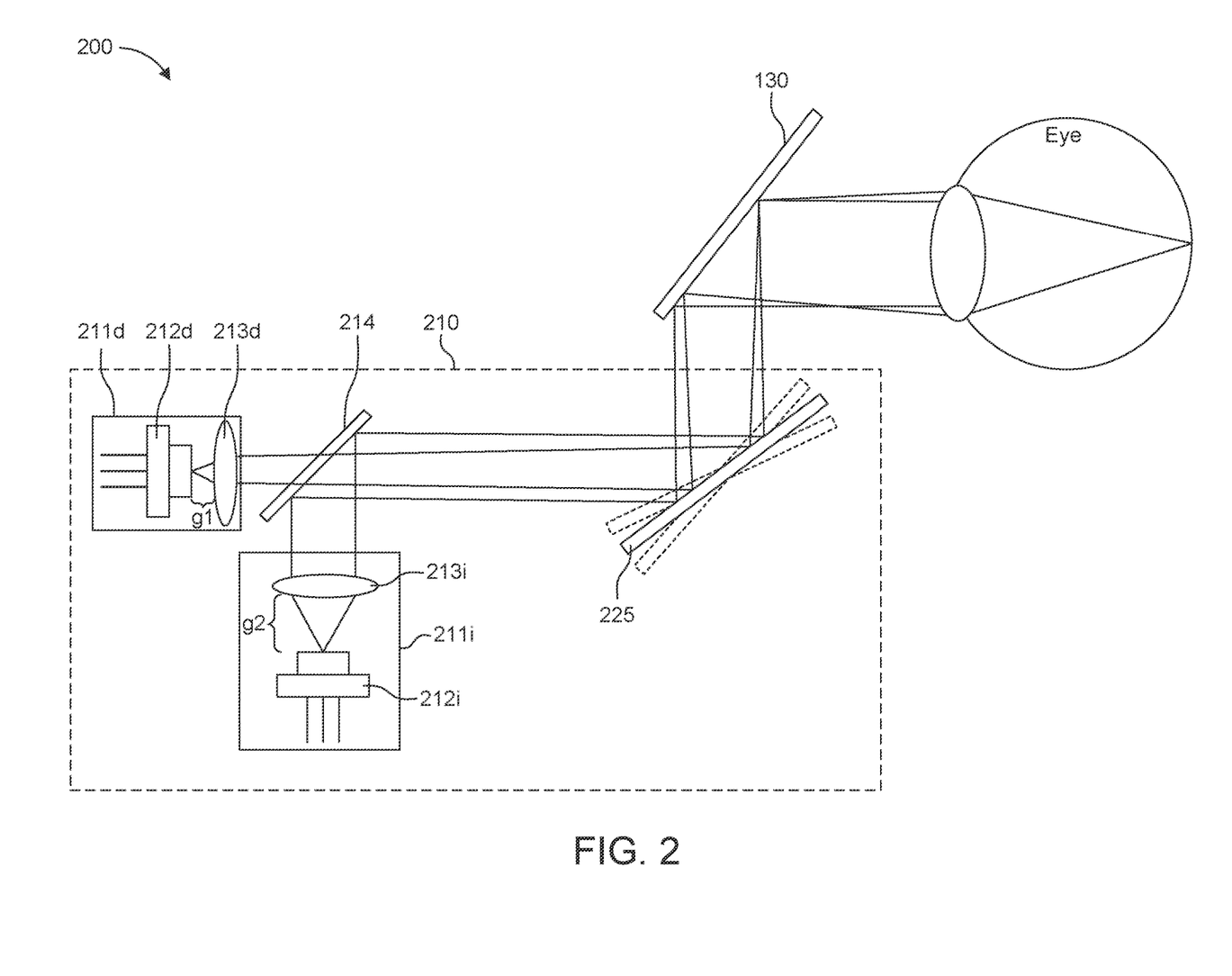
FIG. 2 is a schematic diagram of a multi-plane image projection system according to one or more embodiments.

FIG. 2 is a schematic diagram of a multi-plane image projection system 200 according to one or more embodiments. The multi-plane image projection system 200 includes a projection module 210 that includes N RGB light modules, a beam combiner 214, and a microelectromechanical system (MEMS) mirror 225 that functions as a scanner, where N is an integer greater than 1. The N RGB light modules include a first RGB light module 211i that is configured to transmit RGB light beams that are projected to optical infinity. The N RGB light modules further include at least one additional RGB light module that is configured to transmit RGB light beams that are projected at a preconfigured distance less than optical infinity. The at least one additional RGB light module includes a second RGB light module 211*i*, but additional RGB light modules may be present.

Each of the additional RGB light modules is configured to transmit RGB light beams that correspond to a different projection plane. Each different projection plane is projected at a different distance with respect to the other projection planes. Thus, the projection module 210 includes N-dedicated RGB light modules that are configured to project at N-projection planes at N different distances, with one of those N-projection planes being located at optical infinity. The projection module 210 is capable of projecting images of a singular projection plane, or simultaneously projecting images of two or more projection planes at a time, including simultaneously projecting at all N-projection planes, by transmitting from corresponding RGB light modules.

Each of the N RGB light modules 211*i*, 211*d*, etc. includes an RGB light unit (i.e., a transmitter) 212*i*, 212*d*, etc. having a plurality of light sources, including red (R), green (G), and blue (B) monochromatic light sources (e.g., laser diodes or light emitting diodes). The two RGB light units 212*i*, 212*d* in this example are configured to generate red, green, and blue light beams in the visible light spectrum corresponding to image data to be projected onto the retina of a user's eye. Each RGB light unit 212*i*, 212*d* is configured to transmit the red, green, and blue light beams along a respective transmission path that are to be combined by the beam combiner 214 into a combined transmission path. Each RGB light pulse may be representative of an image pixel of an RGB image. Each RGB light pulse may comprise any combination of a red light pulse, a green light pulse, and/or a blue light pulse emitted simultaneously, including one, two, or three colors in combination at controlled intensities according to the desired pixel hue of the respective image pixel. Accordingly, an RGB light pulse may be referred to as a pixel light pulse.

The beam combiner 214 is located at an intersection of at least two RGB light module transmission paths to direct light received therefrom along the combined transmission path towards the MEMS mirror 225. For example, the beam combiner 214 may be an optical beam splitter that is configured to haves a high transmittivity with respect to the RGB light beams originating from the RGB light unit 212*d* and a high reflectivity with respect to RGB light beams originating from the RGB light unit 212*i*. As such, the RGB light beams originating from the RGB light unit 212*d* may pass through the beam combiner 214 to be coupled into the combined transmission path and the RGB light beams originating from the RGB light unit 212*i* may be reflected by the beam combiner 214 to be coupled into the combined transmission path. Thus, the RGB light beams are coupled into the combined transmission path via the optical beam splitter 214.

Each of the N RGB light modules 211*i*, 211*d*, etc. further includes a beam collimator (e.g., a collimation lens) 213*i*, 213*d*, etc. arranged on a respective transmission path upstream from the beam combiner 214. The beam collimators 213*i*, 213*d*, etc. are arranged such that different divergence angles are realized with respect to the RGB light beams originating from different RGB light units. The different divergence angles are used to realize different projection planes of the N projection planes.

Beam collimator 213*d* is arranged to have a minimum gap distance g1 (i.e., a minimum axial distance) from the RGB light unit 212*d*. As a result of the minimum gap distance g1, the beam collimator 213*d* is configured to receive the RGB light beams from the RGB light unit 212*d* and generate collimated light beams to be projected onto an eye to render a first projection image perceived at the first projection plane. The divergence angle produced by the beam collimator 213*d* is greater than zero, resulting in the first projection plane being projected at a predefined distance less than optical infinity. It is further possible to arrange the beam collimator 213*d* on a movable platform to adjust the minimum gap distance g1, which would thereby adjust the perceived distance of the corresponding projection plane.

In contrast, beam collimator 213*i* is arranged to have a minimum gap distance g2 (i.e., a minimum axial distance) from the RGB light unit 212*i* that is different from minimum gap distance g1. As a result of the minimum gap distance g2, the beam collimator 213*i* is configured to receive the RGB light beams from the RGB light unit 212*i* and generate collimated light beams to be projected onto an eye to render a second projection image perceived at the second projection plane located at optical infinity. The divergence angle produced by the beam collimator 213*i* is equal to zero, resulting in parallel RGB light beams with the second projection plane being projected at optical infinity. It is further possible to arrange the beam collimator 213*i* on a movable platform to adjust the minimum gap distance g2, which would thereby adjust the perceived distance of the corresponding projection plane.

A MEMS mirror is a mechanical moving mirror (i.e., a MEMS micro-mirror) integrated on a semiconductor chip (not shown). The MEMS mirror 225 may be suspended by mechanical springs (e.g., torsion bars) or flexures and is configured to rotate about two axes, for example, an x-axis to perform horizontal scanning and a y-axis (i.e., orthogonal to the x-axis) to perform vertical scanning. Using two scanning axes, the MEMS mirror 225 is able to perform scanning in two-dimensions (2D) and may be used for raster or Lissajous scanning operations.

The MEMS mirror 225 may be a resonator (i.e., a resonant MEMS mirror) configured to oscillate "side-to-side" about each scanning axis such that the light reflected from the MEMS mirror oscillates back and forth in a corresponding scanning direction (e.g., a horizontal scanning direction or a vertical scanning direction). A scanning period or an oscillation period is defined, for example, by one complete oscillation from a first edge of a field of view (e.g., first side) to a second edge of the field of view (e.g., second side) and then back again to the first edge. A mirror period of a MEMS mirror corresponds to a scanning period.

Thus, the field of view is scanned in both scanning directions by changing the angle θx and θy of the MEMS mirror 225 on its respective scanning axes. A particular scanning pattern may be realized by independently configuring an amplitude range (i.e., an angular range of motion) and a driving frequency with respect to a rotation about each axis. In addition, a shape of a driving waveform of the driving signal used to drive the MEMS mirror 225 about each scanning axis may be independently configured to further define the scanning pattern. For example, the driving waveforms may be sinusoidal for both scanning axes, or one may be sinusoidal and the other may be saw-toothed, etc.

Accordingly, the MEMS mirror 225 is arranged on the combined transmission path and is used to steer RGB light received therefrom according to the scanning pattern to render images perceived at different projection planes onto the retina of the eye. The MEMS mirror 225 directs the RGB light further along the combined transmission path towards the beam combiner 130, which then directs the RGB light at the eye for rendering images thereon. The beam combiner 130 is responsible for projecting the RGB images into an eye of a user by directing the RGB images into the field of view of the user's eye. In other words, the beam combiner 130 delivers RGB images generated by the RGB light units 212*d*, 212*i*, etc. to the user's eye in accordance with a controlled scanning pattern and the preconfigured projection planes.

Each RGB light pulse may be representative of an image pixel of an RGB image. Each RGB light pulse may comprise any combination of a red light pulse, a green light pulse, and/or a blue light pulse emitted simultaneously, including one, two, or three colors in combination at controlled intensities according to the desired pixel hue of the respective image pixel. Accordingly, an RGB light pulse may be referred to as a pixel light pulse.

In summary, the multi-plane image projection system 200 incudes a first transmitter configured to generate first light beams corresponding to a first projection plane and transmit the first light beams along a first transmission path; a first collimation lens arranged on the first transmission path, the first collimation lens configured to receive the first light beams and generate first collimated light beams to be projected onto an eye to render a first projection image perceived at the first projection plane; a second transmitter configured to generate second light beams corresponding to a second projection plane different from the first projection plane and transmit the second light beams along a second transmission path; a second collimation lens arranged on the second transmission path, the second collimation lens configured to receive the second light beams and generate second collimated light beams to be projected onto the eye to render a second projection image perceived at the second projection plane; a first beam combiner arranged at an intersection of the first transmission path and the second transmission path, the first beam combiner configured to transmit the first collimated light beams and the second collimated light beams on a combined transmission path; and a scanner arranged on the combined transmission path, the scanner configured to receive the first collimated light beams and the second collimated light beams, and steer the first collimated light beams and the second collimated light beams according to a scanning pattern to render the first projection image and the second projection image onto the eye.

The multi-plane image projection system 200 may further include a second beam combiner arranged between the scanner and the eye, wherein the second beam combiner receives the first collimated light beams and the second collimated light beams and directs the first collimated light beams and the second collimated light beams onto the eye.

The first collimation lens is arranged at a first minimum distance from the first transmitter and the second collimation lens arranged at a second minimum distance from the second transmitter that is different from the first minimum distance. The first collimation lens is either fixed such that the first minimum distance is fixed or movable such that the first minimum distance is adjustable, and the second collimation lens is either fixed such that the second minimum distance is fixed or movable such that the second minimum distance is adjustable.

The first transmitter may be a first RGB transmitter comprising a red light source, a green light source, and a blue light source, and the first projection image is a first RGB image, and the second transmitter may be a second RGB transmitter, and the second projection image is a second RGB image. Alternatively, the first transmitter may be a first monochromatic transmitter and the second transmitter may be a second monochromatic transmitter that transmits the same color as the first monochromatic transmitter. The first transmitter and the second transmitter are configured to transmit the first light beams and the second light beams so as to render the first projection image and the second projection image onto the eye simultaneously.

Figure 3A:
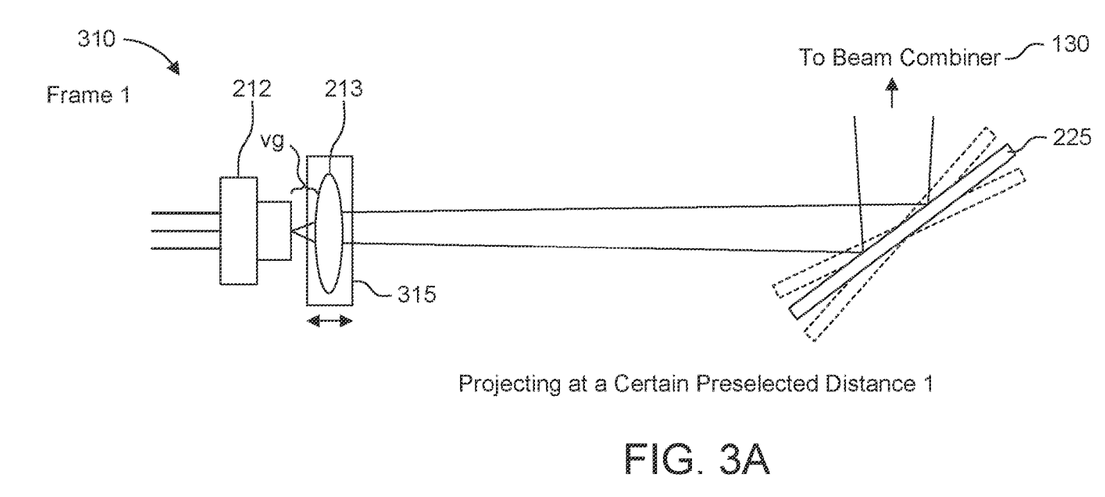
FIGS. 3A and 3B are schematic diagrams of a projection module of a multi-plane image projection system according to one or more embodiments.
Figure 3B:
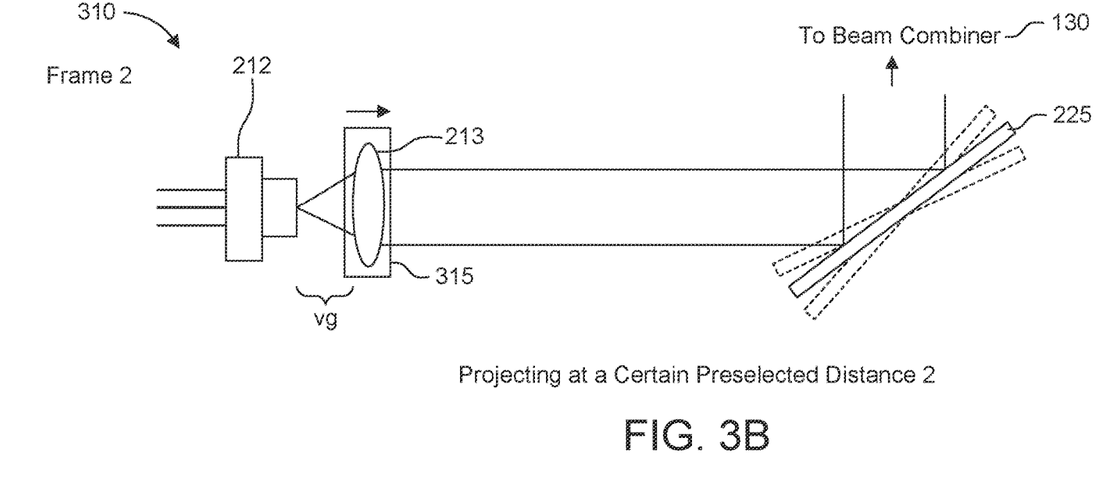

FIGS. 3A and 3B are schematic diagrams of a projection module 310 of a multi-plane image projection system according to one or more embodiments. As similarly described in reference to the multi-plane image projection system 200, a projection module is part of a multi-plane image projection system that may further include beam combiner 130. Here, the projection module 310 includes a single RGB light unit (i.e., a transmitter) 212 and a movable beam collimator 213 is arranged to have a minimum variable gap distance vg (i.e., a minimum axial distance) from the RGB light unit 212. For example, the movable beam collimator 213 may be fixed to a movable platform 315 that moves in order to change (i.e., increase or decrease) the minimum variable gap distance vg in order to project images at different projection planes. In other words, the minimum variable gap distance vg can be varied to project images at certain preselected distances, including optical infinity or less than optical infinity. Light beams from the movable beam collimator 213 are received at the MEMS mirror 225 that directs the light beams to the beam combiner 130 (not illustrated) according to a scanning pattern.

As a result, projection of N-projection planes requires only a single, but focusable, RGB laser module. However, only one projection plane can be projected at a time (i.e., no transparent virtual objects). Furthermore, each laser module is accompanied by a focusing mechanism (i.e., the movable beam collimator 213).

As shown in FIG. 3A, a first image frame (Frame 1) is projected at a projection plane perceived at a first preselected distance. In FIG. 3B, a second image frame (Frame 2) is projected at a projection plane perceived at a second preselected distance. Thus, the projection module 310 provides sequential plane projection via laser focusing and the minimum variable gap distance vg can be adjusted on a frame-by-frame basis.

In summary, the image projection system includes a transmitter configured to generate first light beams corresponding to a first projection plane, generate second light beams corresponding to a second projection plane, and sequentially transmit the first light beams and the second along a transmission path; a movable collimation lens arranged on the transmission path and is configured to move axially relative to the transmitter such that a minimum axial distance from the transmitter changes, wherein the movable collimation lens is configured to receive the first light beams when at a first minimum axial distance from the transmitter, generate first collimated light beams to be projected onto an eye to render a first projection image perceived at the first projection plane, receive the second light beams when at a second minimum axial distance from the transmitter different from the first minimum axial distance, and generate second collimated light beams to be projected onto the eye to render a second projection image perceived at the second projection plane different from the first projection plane; and a scanner arranged on the transmission path, the scanner configured to receive the first collimated light beams and the second collimated light beams, and steer the first collimated light beams and the second collimated light beams according to at least one scanning pattern to render the first projection image and the second projection image onto the eye.

The image projection system may further include a beam combiner arranged between the scanner and the eye, wherein the beam combiner receives the first collimated light beams and the second collimated light beams and directs the first collimated light beams and the second collimated light beams onto the eye.

Figure 4A:
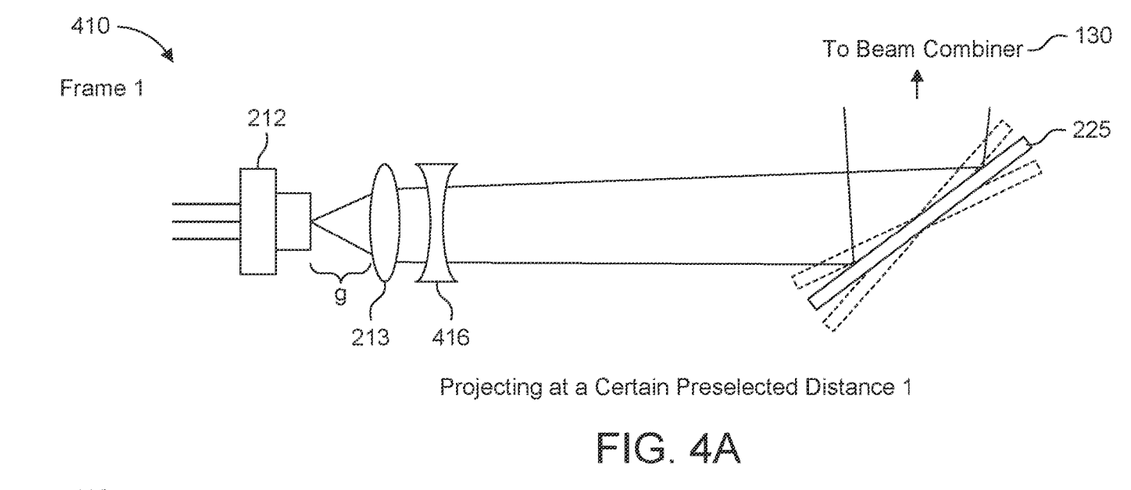
FIGS. 4A and 4B are schematic diagrams of another projection module of a multi-plane image projection system according to one or more embodiments.
Figure 4B:
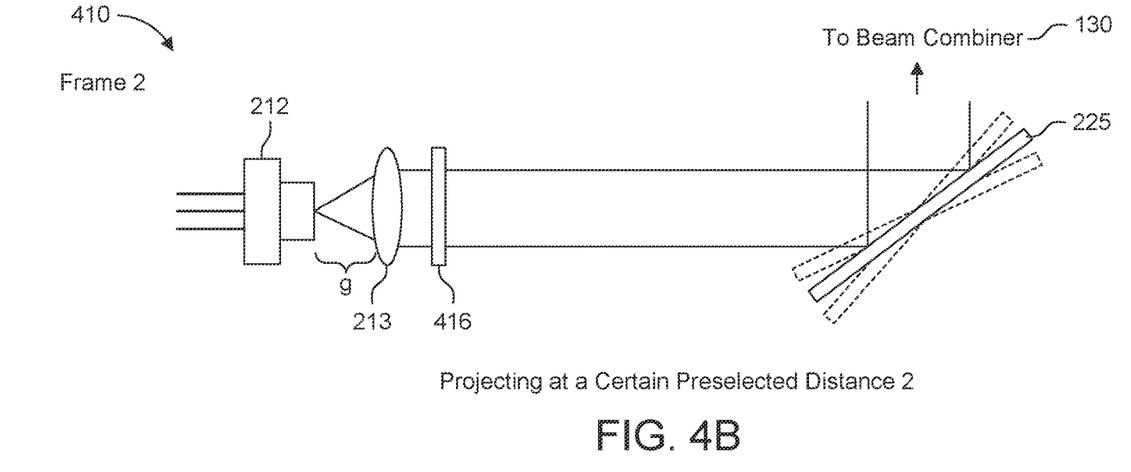

FIGS. 4A and 4B are schematic diagrams of a projection module 410 of a multi-plane image projection system according to one or more embodiments. As similarly described in reference to the multi-plane image projection system 200, a projection module is part of a multi-plane image projection system that may further include beam combiner 130. Here, the projection module 410 includes a single RGB light unit (i.e., a transmitter) 212, a fixed beam collimator 213, and an adjustable optical element 416 (e.g., an adjustable lens) that has an adjustable shape. In particular, the shape of the adjustable optical element 416 can be adjusted to change its focal length. Thus, different divergence angles can be realized with respect to the RGB light beams originating from the RGB light unit 212. The different divergence angles are used to realize different projection planes, including a projection plane projected at optical infinity and projection planes projected at preselected distances shorter than optical infinity.

The gap distance g (i.e., an axial distance) from the RGB light unit 212 to the fixed beam collimator 213 remains fixed. That is, a single gap distance g is used for all projection planes. Light beams from the adjustable optical element 416 are received at the MEMS mirror 225 that directs the light beams to the beam combiner 130 (not illustrated) according to a scanning pattern.

As shown in FIG. 4A, a first image frame (Frame 1) is projected at a projection plane perceived at a first preselected distance. The shape of the adjustable optical element 416 is such that the divergence angle of the RGB light beams is greater than zero. As a result, the first preselected distance is less than optical infinity. In FIG. 4A, the adjustable optical element 416 takes on the shape of a negative lens with a preselected focal length that can be adjusted according to the desired distance at which the projection plane is to be projected.

In FIG. 4B, a second image frame (Frame 2) is projected at a projection plane perceived at a second preselected distance. The shape of the adjustable optical element 416 is such that the divergence angle of the RGB light beams is equal to zero, thereby ensuring that the RGB light beams remain parallel to each other. As a result, the second preselected distance is equivalent to optical infinity. In FIG. 4B, the adjustable optical element 416 takes on a shape of a zero power optical element.

Thus, the projection module 410 provides sequential plane projection via the adjustable optical element 416 and the shape of the adjustable optical element 416 can be adjusted on a time basis.

In summary, the image projection system includes a transmitter configured to generate first light beams corresponding to a first projection plane, generate second light beams corresponding to a second projection plane, and sequentially transmit the first light beams and the second along a transmission path; a collimation lens arranged on the transmission path, the first collimation lens configured to receive the first light beams, transmit the first light beams as first collimated light beams, receive the second light beams, and transmit the second light beams as second collimated light beams; and an adjustable optical element arranged on the transmission path and configured to adjust its focal length to include at least a first focal length corresponding to the first projection plane and a second focal length corresponding to the second projection plane.

The adjustable optical element is configured to receive the first collimated light beams when its focal length is set at the first focal length and transmit the first collimated light beams as first compensated light beams to be projected onto an eye to render a first projection image perceived at the first projection plane. The adjustable optical element is configured to receive the second collimated light beams when its focal length is set at the second focal length and transmit the second collimated light beams as second compensated light beams to be projected onto the eye to render a second projection image perceived at the second projection plane different from the first projection plane.

The image projection system further includes a scanner arranged on the transmission path, the scanner configured to receive the first compensated light beams and the second compensated light beams, and steer the first compensated light beams and the second compensated light beams according to at least one scanning pattern to render the first projection image and the second projection image onto the eye.

The image projection system may further include a beam combiner arranged between the scanner and the eye, wherein the beam combiner receives the first collimated light beams and the second collimated light beams and directs the first collimated light beams and the second collimated light beams onto the eye.

The transmitter may be an RGB transmitter comprising a red light source, a green light source, and a blue light source, and the first and the second projection images are RGB images.

Figure 5:
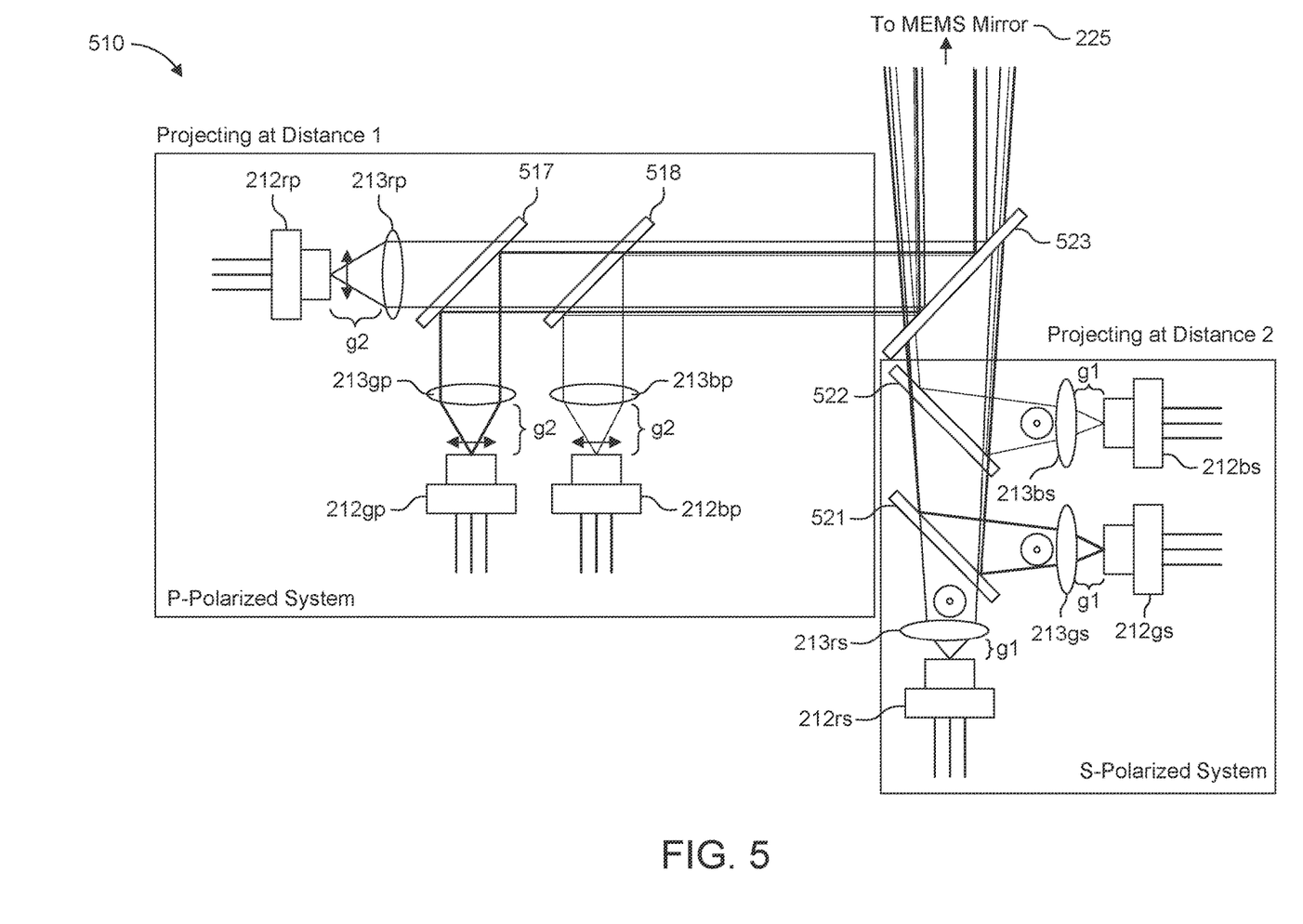
FIG. 5 is a schematic diagram of another projection module of a multi-plane image projection system according to one or more embodiments.

FIG. 5 is a schematic diagram of a projection module 510 of a multi-plane image projection system according to one or more embodiments. As similarly described in reference to the multi-plane image projection system 200, a projection module is part of a multi-plane image projection system that may further include beam combiner 130. While not shown, the projection module 510 further includes MEMS mirror 225 that receives light beams and steers them according to a scanning pattern to render images onto an eye.

The projection module 510 includes a first plurality of monochromatic transmitters 212*rp*, 212*gp*, and 212*bp* configured to transmit first polarized light beams corresponding to a first projection plane. In particular, the first plurality of monochromatic transmitters 212*rp*, 212*gp*, and 212*bp* generate p-polarized light beams, with transmitter 212*rp* generating red p-polarized light beams, transmitter 212*gp* generating green p-polarized light beams, and transmitter 212*bp* generating blue p-polarized light beams. Together, the transmission of the red, green, and blue polarized light beams are synchronized to form an image pixel of an RGB image and transmitters 212*rp*, 212*gp*, and 212*bp* are used to render a first RGB image.

The projection module 510 further includes a first plurality of collimation lenses 213*rp*, 213*gp*, and 213*bp* corresponding to the first plurality of monochromatic transmitters 212*rp*, 212*gp*, and 212*bp*, wherein each of the first plurality of collimation lenses 213*rp*, 213*gp*, and 213*bp* is configured to receive a first polarized light beam from a different one of the first plurality of monochromatic transmitters 212*rp*, 212*gp*, and 212*bp* such that the first plurality of collimation lenses 213*rp*, 213*gp*, and 213*bp* generate first polarized collimated light beams to be projected onto an eye to render a first projection image perceived at the first projection plane.

Each of the first plurality of collimation lenses 213*rp*, 213*gp*, and 213*bp* is arranged at a gap distance g2 from the its respective transmitter 212*rp*, 212*gp*, and 212*bp*. As a result of the gap distance g2, each of the first plurality of collimation lenses 213*rp*, 213*gp*, and 213*bp* is configured to receive monochromatic, p-polarized light beams and generate collimated light beams to be projected onto an eye to render a projection image perceived at optical infinity.

The projection module 510 further includes polarizing beam combiner 523 that is configured to reflect p-polarized light and transmit s-polarized light in order to couple different types of polarized light into a combined transmission path on which the MEMS mirror 225 (not illustrated) is arranged. The polarizing beam combiner 523 directs light beams of different polarizations towards the MEMS mirror 225.

The projection module 510 further includes a first plurality of dichroic mirrors 517 and 518 configured to direct the first polarized collimated light beams at the polarizing beam combiner 523. In this example, the dichroic mirrors 517 and 518 are configured to transmit red light received from the transmitter 212*rp* and reflect green and blue light received from transmitters 212*gp* and 212*bp*, respectively. Thus, the first polarized collimated light beams are coupled into a same transmission path by the dichroic mirrors 517 and 518 and are directed towards the polarizing beam combiner 523.

The projection module 510 includes a second plurality of monochromatic transmitters 212*rs*, 212*gs*, and 212*bs* configured to transmit second polarized light beams corresponding to a second projection plane. In particular, the second plurality of monochromatic transmitters 212*rs*, 212*gs*, and 212*bs* generate s-polarized light beams, with transmitter 212*rs* generating red s-polarized light beams, transmitter 212*gs* generating green s-polarized light beams, and transmitter 212*bs* generating blue s-polarized light beams. Together, the red, green, and blue polarized light beams form an image pixel of an RGB image and transmitters 212*rs*, 212*gs*, and 212*bs* are used to render a second RGB image.

The projection module 510 further includes a second plurality of collimation lenses 213*rs*, 213*gs*, and 213*bs* corresponding to the second plurality of monochromatic transmitters 212*rs*, 212*gs*, and 212*bs*, wherein each of the second plurality of collimation lenses 213*rs*, 213*gs*, and 213*bs* is configured to receive a second polarized light beam from a different one of the second plurality of monochromatic transmitters 212*rs*, 212*gs*, and 212*bs* such that the second plurality of collimation lenses 213*rs*, 213*gs*, and 213*bs* generate second polarized collimated light beams to be projected onto an eye to render a second projection image perceived at the second projection plane.

Each of the second plurality of collimation lenses 213*rs*, 213*gs*, and 213*bs* is arranged at a minimum gap distance g1 (i.e., a minimum axial distance) from the its respective transmitter 212*rs*, 212*gs*, and 212*bs*. As a result of the minimum gap distance g1, each of the second plurality of collimation lenses 213*rs*, 213*gs*, and 213*bs* is configured to receive monochromatic, s-polarized light beams and generate collimated light beams to be projected onto an eye to render a projection image perceived at a distance less than optical infinity.

The projection module 510 further includes a second plurality of dichroic mirrors 521 and 522 configured to direct the second polarized collimated light beams at the polarizing beam combiner 523. In this example, the dichroic mirrors 521 and 522 are configured to transmit red light received from the transmitter 212*rs* and reflect green and blue light received from transmitters 212*gs* and 212*bs*, respectively. Thus, the second polarized collimated light beams are coupled into a same transmission path by the dichroic mirrors 521 and 522 and are directed towards the polarizing beam combiner 523.

The polarizing beam combiner 523 is arranged at an intersection of the first polarized collimated light beams and the second polarized collimated light beams to direct the first polarized collimated light beams and the second polarized collimated light beams on a combined transmission path. Thus, both the p-polarized light beams and the s-polarized light beams are transmitted at the MEMS mirror 225 that is arranged on the combined transmission path. The MEMS mirror 225 is configured to receive the first polarized collimated light beams and the second polarized collimated light beams, and steer the first polarized collimated light beams and the second polarized collimated light beams according to a scanning pattern to render the first projection image and the second projection image onto the eye.

The polarizing beam combiner 523 comprises a first surface at which the p-polarized light beams are received and a second surface at which the s-polarized light beams are received, wherein the polarizing beam combiner 523 is configured to reflect the p-polarized light beams received at the first surface and transmit the s-polarized light beams received at the second surface, or reflect the s-polarized light beams received at the second surface and transmit the p-polarized light beams received at the first surface. In other words, the p-polarized system the s-polarized system can swap positions and the polarizations of the reflective and transmission surfaces of the polarizing beam combiner 523 can be designed accordingly.

The projection module 510 may further include beam combiner 130 (not illustrated) arranged between the scanner 225 and the eye, wherein the beam combiner 130 receives the first polarized collimated light beams and the second polarized collimated light beams and directs the first polarized collimated light beams and the second polarized collimated light beams onto the eye.

Figure 6:
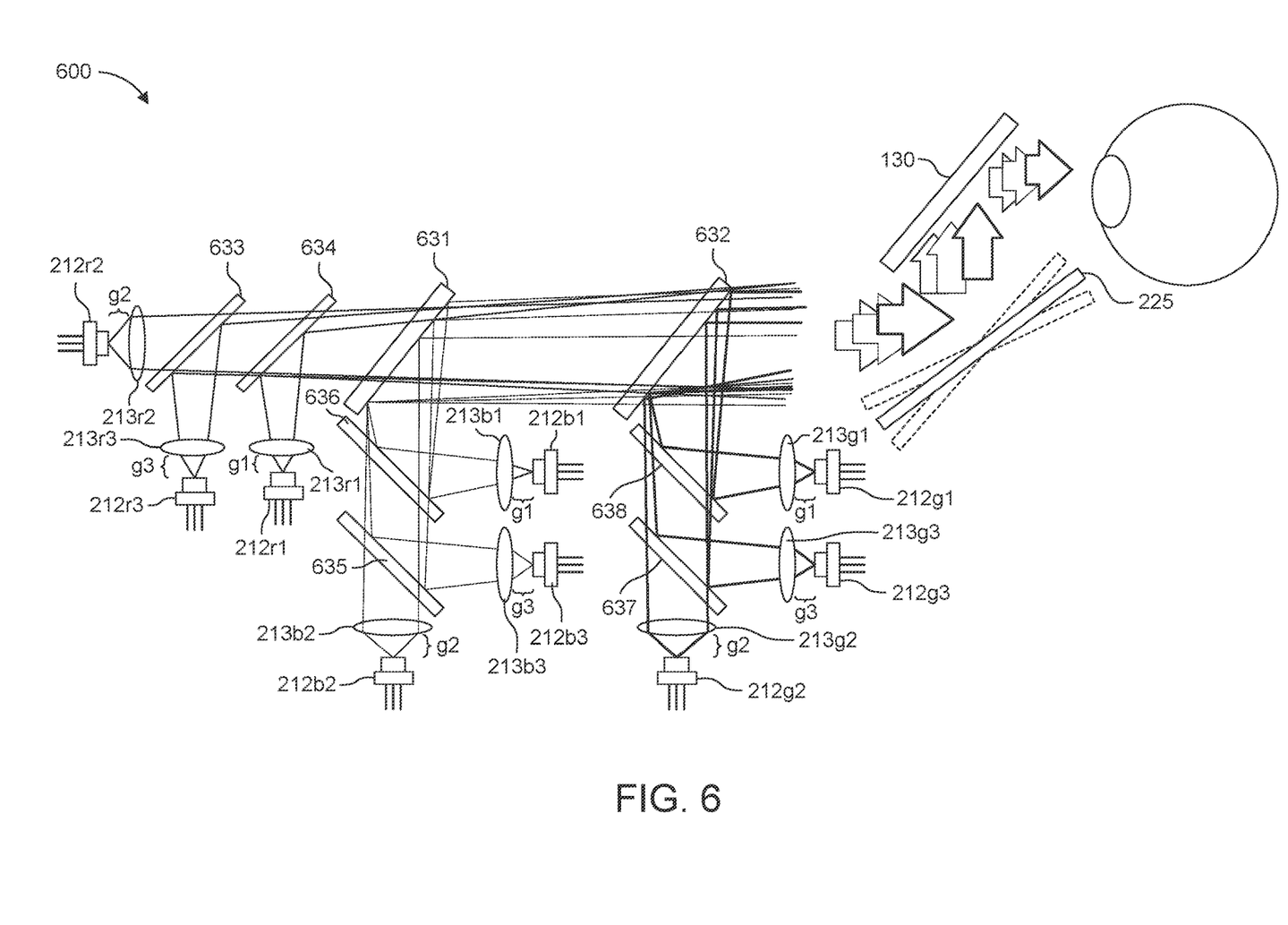
FIG. 6 is a schematic diagram of another multi-plane image projection system according to one or more embodiments.

FIG. 6 is a schematic diagram of a multi-plane image projection system 600 according to one or more embodiments. The multi-plane image projection system 600 includes a dichroic mirror system used to couple light beams received from multiple monochromatic transmitters into a combined transmission path on which the MEMS mirror 225 is arranged for receiving the light beams.

The multi-plane image projection system 600 incudes a first plurality of monochromatic transmitters 212*r*1, 212*r*2, 212*r*3 configured to transmit a first plurality of light beams corresponding to a plurality of projection planes that are perceived at different distances. In other words, each of the first plurality of monochromatic transmitters 212*r*1, 212*r*2, 212*r*3 transmits light at a different projection plane and the number of monochromatic transmitters is equal to the number of projection planes to which the system 600 can project. Different gap distances g1, g2, and g3 are used to set the perceived distance of each projection plane.

As will become readily apparent, each of the first plurality of monochromatic transmitters 212*r*1, 212*r*2, 212*r*3 will be matched and synchronized with a corresponding one of a second plurality of monochromatic transmitters 212*g*1, 212*g*2, 212*g*3 and a corresponding one of a third plurality of monochromatic transmitters 212*b*1, 212*b*2, 212*b*.

Each of the first plurality of monochromatic transmitters 212*r*1, 212*r*2, 212*r*3 are configured to transmit red light with slightly different wavelengths to be propagated properly in the dichroic mirror system with minimal to no loss (i.e., a lossless method). Similarly, each of the second plurality of monochromatic transmitters 212*b*1, 212*b*2, 212*b*3 are configured to transmit blue light with slightly different wavelengths to be propagated properly in the dichroic mirror system with minimal to no loss (i.e., a lossless method). Similarly, each of the second plurality of monochromatic transmitters 212g1, 212g2, 212g3 are configured to transmit green light with slightly different wavelengths to be propagated properly in the dichroic mirror system with minimal to no loss (i.e., a lossless method). Thus, the first plurality of monochromatic transmitters are red light transmitters that transmit at different wavelengths with respect to each other, the second plurality of monochromatic transmitters are blue light transmitters that transmit at different wavelengths with respect to each other, and the third plurality of monochromatic transmitters are green light transmitters that transmit at different wavelengths with respect to each other.

The multi-plane image projection system 600 further incudes a first plurality of collimation lenses 213r1, 213r2, 213r3 corresponding to the first plurality of monochromatic transmitters 212r1, 212r2, 212r3, wherein each of the first plurality of collimation lenses 213r1, 213r2, 213r3 is configured to receive a corresponding light beam from a different one of the first plurality of monochromatic transmitters 212r1, 212r2, 212r3 such that the first plurality of collimation lenses generate a first plurality of collimated light beams to be projected onto an eye to render a plurality of projection images, each to be perceived at a different one of plurality of projection planes.

The multi-plane image projection system 600 further incudes the MEMS mirror 225 configured to receive the first plurality of collimated light beams and steer the first plurality of collimated light beams according to a scanning pattern to render the plurality of projection images onto the eye.

The multi-plane image projection system 600 further includes a second plurality of monochromatic transmitters 212b1, 212b2, 212b3 configured to transmit a second plurality of light beams corresponding to the plurality of projection planes. A second plurality of collimation lenses 213b1, 213b2, 213b3 corresponding to the second plurality of monochromatic transmitters 212b1, 212b2, 212b3 are provided, wherein each of the second plurality of collimation lenses 213b1, 213b2, 213b3 is configured to receive a corresponding light beam from a different one of the second plurality of monochromatic transmitters 212b1, 212b2, 212b3 such that the second plurality of collimation lenses 213b1, 213b2, 213b3 generate a second plurality of collimated light beams to be projected onto the eye to render the plurality of projection images, each to be perceived at a different one of plurality of projection planes.

The multi-plane image projection system 600 further incudes a beam combiner 631 arranged at an intersection of the first plurality of collimated light beams (red light) and the second plurality of collimated light beams (blue light) to direct the first plurality of collimated light beams and the second plurality of collimated light beams on a combined transmission path. The beam combiner 631 may be a dichroic mirror that is configured to transmit wavelengths corresponding to the first plurality of collimated light beams (e.g., red light) and reflect wavelengths corresponding to the second plurality of collimated light beams (e.g., blue light).

The MEMS mirror 225 is arranged on the combined transmission path to receive the first plurality of collimated light beams and the second plurality of collimated light beams and steer the first plurality of collimated light beams and the second plurality of collimated light beams according to the scanning pattern to render the plurality of projection images onto the eye.

The multi-plane image projection system 600 further includes a second plurality of monochromatic transmitters 212g1, 212g2, 212g3 configured to transmit a third plurality of light beams corresponding to the plurality of projection planes. A third plurality of collimation lenses 213g1, 213g2, 213g3 corresponding to the third plurality of monochromatic transmitters 212g1, 212g2, 212g3, wherein each of the third plurality of collimation lenses 213g1, 213g2, 213g3 is configured to receive a corresponding light beam from a different one of the third plurality of monochromatic transmitters 212g1, 212g2, 212g3 such that the third plurality of collimation lenses 213g1, 213g2, 213g3 generate a third plurality of collimated light beams to be projected onto the eye to render the plurality of projection images, each to be perceived at a different one of plurality of projection planes.

Another beam combiner 632 is arranged on the combined transmission path between the beam combiner 631 and the MEMS mirror 225 such that it is located downstream from the beam combiner 631 to receive the first plurality of collimated light beams and the second plurality of collimated light beams therefrom. Thus, the beam combiner 632 is arranged at an intersection of the first plurality of collimated light beams, the second plurality of collimated light beams, and the third plurality of collimated light beams to direct the first plurality of collimated light beams, the second plurality of collimated light beams, and the third plurality of collimated light beams on the combined transmission path towards the MEMS mirror 225. The beam combiner 632 may be a dichroic mirror with a that is configured to transmit wavelengths corresponding to the first and the second plurality of collimated light beams (e.g., red and blue light) and reflect wavelengths corresponding to the third plurality of collimated light beams (e.g., green light). The beam combiner 632 is responsible for ensuring all light beams are coupled into the combined transmission path and directed at the MEMS mirror 225.

The MEMS mirror 225 is arranged on the combined transmission path downstream from beam combiner 632 to receive the first plurality of collimated light beams, the second plurality of collimated light beams, and the third plurality of collimated light beams and steer the first plurality of collimated light beams, the second plurality of collimated light beams, and the third plurality of collimated light beams according to the scanning pattern to render the plurality of projection images onto the eye.

The multi-plane image projection system 600 further includes a first plurality of dichroic mirrors 633 and 634 configured to direct the first plurality of collimated light beams at the beam combiner 631, a second plurality of dichroic mirrors 635 and 636 configured to direct the second plurality of collimated light beams at the beam combiner 631, and a third plurality of dichroic mirrors 637 and 638 configured to direct the third plurality of collimated light beams at the beam combiner 632.

Because the first plurality of collimated light beams have slightly different wavelengths, dichroic mirror 633 transmits light received from transmitter 612r2 and reflects light received from transmitter 612r3. Similarly, dichroic mirror 634 transmits light received from transmitters 612r2, 612r3 and reflects light received from transmitter 612r1.

Similarly, because the second plurality of collimated light beams have slightly different wavelengths, dichroic mirror 635 transmits light received from transmitter 612b2 and reflects light received from transmitter 612b3. Similarly, dichroic mirror 636 transmits light received from transmitters 612b2, 612b3 and reflects light received from transmitter 612b1.

Similarly, because the third plurality of collimated light beams have slightly different wavelengths, dichroic mirror 637 transmits light received from transmitter 612g2 and reflects light received from transmitter 612g3. Similarly, dichroic mirror 638 transmits light received from transmitters 612g2, 612g3 and reflects light received from transmitter 612g1.

Alternatively 633, 634, 635, 636, 637, 638 may be mirrors with a fixed transmission ratio (e.g., 50:50 transmission: reflection for 633, 635, 637, and 0.6(6):0.3(3) transmission: reflection for 634, 636, 638) to have equal contribution of all combined wavelengths.

The first plurality of dichroic mirrors 633, 634 are configured to direct the first plurality of collimated light beams on a same transmission path, and the first plurality of monochromatic transmitters 212r1, 212r2, 212r3 are configured to transmit substantially a same color of light at different wavelengths with respect to each other.

The second plurality of dichroic mirrors 635, 636 are configured to direct the second plurality of collimated light beams on a same transmission path, and the second plurality of monochromatic transmitters 212b1, 212b2, 212b3 are configured to transmit substantially a same color of light at different wavelengths with respect to each other.

The third plurality of dichroic mirrors 637, 638 are configured to direct the third plurality of collimated light beams on a same transmission path, and the third plurality of monochromatic transmitters 212g1, 212g2, 212g3 are configured to transmit substantially a same color of light at different wavelengths with respect to each other.

Each of the first plurality of monochromatic transmitters 212r1, 212r2, 212r3 is paired with one of the first plurality of collimation lenses 213r1, 213r2, 213r3 to form a pair such that each pair is separated by a respective distance corresponding to a different one of the plurality of projection planes with each respective minimum distance being different from each other. Each of the first plurality of collimation lenses 213r1, 213r2, 213r3 is either fixed such that each respective distance is fixed or movable such that each respective distance is adjustable. Similar features can be extended to the second and third plurality of transmitters and collimation lenses In view of the above, the images at multiple projection planes can be rendered simultaneously or sequentially using the embodiments described herein.

In addition to the embodiments defined by the claims, additional embodiments are provided below.

1. An image projection system, comprising:

a transmitter configured to generate first light beams corresponding to a first projection plane, generate second light beams corresponding to a second projection plane, and sequentially transmit the first light beams and the second along a transmission path;

a movable collimation lens arranged on the transmission path and is configured to move axially relative to the transmitter such that a minimum axial distance from the transmitter changes, wherein the movable collimation lens is configured to receive the first light beams when at a first minimum axial distance from the transmitter, generate first collimated light beams to be projected onto an eye to render a first projection image perceived at the first projection plane, receive the second light beams when at a second minimum axial distance from the transmitter different from the first minimum axial distance, and generate second collimated light beams to be projected onto the eye to render a second projection image perceived at the second projection plane different from the first projection plane; and a scanner arranged on the transmission path, the scanner configured to receive the first collimated light beams and the second collimated light beams, and steer the first collimated light beams and the second collimated light beams according to at least one scanning pattern to render the first projection image and the second projection image onto the eye.

2. The image projection system of embodiment 1, further comprising:

a beam combiner arranged between the scanner and the eye, wherein the beam combiner receives the first collimated light beams and the second collimated light beams and directs the first collimated light beams and the second collimated light beams onto the eye.

3. The image projection system of embodiment 1, wherein:

the first projection plane is projected to optical infinity, and the second projection plane is projected at a predefined distance less than optical infinity.

4. The image projection system of embodiment 3, wherein optical infinity is equivalent to a virtual distance of at least 9.5 meters.

5. The image projection system of embodiment 1, wherein:

the first projection plane is projected at a first predefined distance, and the second projection plane is projected at a second predefined distance different from the first predefined distance.

6. The image projection system of embodiment 1, wherein:

the transmitter is a first red-green-blue (RGB) transmitter comprising a red light source, a green light source, and a blue light source, and the first and the second projection images are RGB images.

7. An image projection system, comprising:

a transmitter configured to generate first light beams corresponding to a first projection plane, generate second light beams corresponding to a second projection plane, and sequentially transmit the first light beams and the second along a transmission path;

a collimation lens arranged on the transmission path, the first collimation lens configured to receive the first light beams, transmit the first light beams as first collimated light beams, receive the second light beams, and transmit the second light beams as second collimated light beams;

an adjustable optical element arranged on the transmission path and configured to adjust its focal length to include at least a first focal length corresponding to the first projection plane and a second focal length corresponding to the second projection plane, wherein the adjustable optical element is configured to receive the first collimated light beams when its focal length is set at the first focal length and transmit the first collimated light beams as first compensated light beams to be projected onto an eye to render a first projection image perceived at the first projection plane, and wherein the adjustable optical element is configured to receive the second collimated light beams when its focal length is set at the second focal length and transmit the second collimated light beams as second compensated light beams to be projected onto the eye to render a second projection image perceived at the second projection plane different from the first projection plane; and a scanner arranged on the transmission path, the scanner configured to receive the first compensated light beams and the second compensated light beams, and steer the first compensated light beams and the second compensated light beams according to at least one scanning pattern to render the first projection image and the second projection image onto the eye.

8. The image projection system of embodiment 7, further comprising:

a beam combiner arranged between the scanner and the eye, wherein the beam combiner receives the first collimated light beams and the second collimated light beams and directs the first collimated light beams and the second collimated light beams onto the eye.

9. The image projection system of embodiment 7, wherein:

the first projection plane is projected to optical infinity, and the second projection plane is projected at a predefined distance less than optical infinity.

10. The image projection system of embodiment 9, wherein optical infinity is equivalent to a virtual distance of at least 9.5 meters.

11. The image projection system of embodiment 7, wherein:

the first projection plane is projected at a first predefined distance, and the second projection plane is projected at a second predefined distance different from the first predefined distance.

12. The image projection system of embodiment 7, wherein:

the transmitter is a first red-green-blue (RGB) transmitter comprising a red light source, a green light source, and a blue light source, and the first and the second projection images are RGB images.

Although embodiments described herein relate to MEMS devices with a mirror, it is to be understood that other implementations may include optical devices other than MEMS mirror devices. In addition, although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the method steps may be executed by such an apparatus.

While various embodiments have been described, it will be apparent to those of ordinary skill in the art that many more embodiments and implementations are possible within the scope of the disclosure. Accordingly, the invention is not to be restricted except in light of the attached claims and their equivalents. With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor" or "processing circuitry" as used herein refers to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

Thus, the techniques described in this disclosure may be implemented, at least in part, in hardware, software, firmware, or any combination thereof. For example, various aspects of the described techniques may be implemented within one or more processors, including one or more microprocessors, DSPs, ASICs, or any other equivalent integrated or discrete logic circuitry, as well as any combinations of such components.

A controller including hardware may also perform one or more of the techniques described in this disclosure. Such hardware, software, and firmware may be implemented within the same device or within separate devices to support the various techniques described in this disclosure. Software may be stored on a non-transitory computer-readable medium such that the non-transitory computer readable medium includes a program code or a program algorithm stored thereon which, when executed, causes the controller, via a computer program, to perform the steps of a method.

Although various exemplary embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. It is to be understood that other embodiments may be utilized and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

What is claimed is:

1. An image projection system, comprising:
a first transmitter configured to generate first light beams corresponding to a first projection plane and transmit the first light beams along a first transmission path;
a first collimation lens arranged on the first transmission path, the first collimation lens configured to receive the first light beams and generate first collimated light beams to be projected onto an eye to render a first projection image perceived at the first projection plane;
a second transmitter configured to generate second light beams corresponding to a second projection plane different from the first projection plane and transmit the second light beams along a second transmission path;
a second collimation lens arranged on the second transmission path, the second collimation lens configured to receive the second light beams and generate second collimated light beams to be projected onto the eye to render a second projection image perceived at the second projection plane;
a first beam combiner arranged at an intersection of the first transmission path and the second transmission path, the first beam combiner configured to transmit the first collimated light beams and the second collimated light beams on a combined transmission path; and
a scanner arranged on the combined transmission path, the scanner configured to receive the first collimated light beams and the second collimated light beams, and steer the first collimated light beams and the second collimated light beams according to a scanning pattern to render the first projection image and the second projection image onto the eye.

2. The image projection system of claim 1, further comprising:
a second beam combiner arranged between the scanner and the eye, wherein the second beam combiner receives the first collimated light beams and the second collimated light beams and directs the first collimated light beams and the second collimated light beams onto the eye.

3. The image projection system of claim 1, wherein:
the first collimation lens is arranged at a first distance from the first transmitter; and
the second collimation lens is arranged at a second distance from the second transmitter that is different from the first distance.

4. The image projection system of claim 3, wherein:
the first collimation lens is either fixed such that the first distance is fixed or movable such that the first distance is adjustable, and
the second collimation lens is either fixed such that the second distance is fixed or movable such that the second distance is adjustable.

5. The image projection system of claim 1, wherein:
the first projection plane is projected to optical infinity, and
the second projection plane is projected at a predefined distance less than optical infinity.

6. The image projection system of claim 5, wherein optical infinity is equivalent to a virtual distance of at least 9.5 meters.

7. The image projection system of claim 1, wherein:
the first projection plane is projected at a first predefined distance, and
the second projection plane is projected at a second predefined distance different from the first predefined distance.

8. The image projection system of claim 1, wherein:
the first transmitter is a first red-green-blue (RGB) transmitter comprising a red light source, a green light source, and a blue light source, and the first projection image is a first RGB image, and
the second transmitter is a second RGB transmitter, and the second projection image is a second RGB image.

9. The image projection system of claim 1, wherein:
the first transmitter is a first monochromatic transmitter, and
the second transmitter is a second monochromatic transmitter that transmits the a same color as the first monochromatic transmitter.

10. The image projection system of claim 1, wherein the first transmitter and the second transmitter are configured to transmit the first light beams and the second light beams so as to render the first projection image and the second projection image onto the eye simultaneously.

11. An image projection system, comprising:
a first plurality of monochromatic transmitters configured to transmit first polarized light beams corresponding to a first projection plane;
a first plurality of collimation lenses corresponding to the first plurality of monochromatic transmitters, wherein each of the first plurality of collimation lenses is configured to receive a first polarized light beam from a different one of the first plurality of monochromatic transmitters such that the first plurality of collimation lenses generate first polarized collimated light beams to be projected onto an eye to render a first projection image perceived at the first projection plane;
a second plurality of monochromatic transmitters configured to transmit second polarized light beams corresponding to a second projection plane;
a second plurality of collimation lenses corresponding to the second plurality of monochromatic transmitters, wherein each of the second plurality of collimation lenses is configured to receive a second polarized light beam from a different one of the second plurality of monochromatic transmitters such that the second plurality of collimation lenses generate second polarized collimated light beams to be projected onto the eye to render a second projection image perceived at the second projection plane;
a polarizing beam combiner arranged at an intersection of the first polarized collimated light beams and the second polarized collimated light beams to direct the first polarized collimated light beams and the second polarized collimated light beams on a combined transmission path; and
a scanner arranged on the combined transmission path, the scanner configured to receive the first polarized collimated light beams and the second polarized collimated light beams, and steer the first polarized collimated light beams and the second polarized collimated light beams according to a scanning pattern to render the first projection image and the second projection image onto the eye.

12. The image projection system of claim 11, wherein:
the first polarized light beams are p-polarized light beams and the second polarized light beams are s-polarized light beams, and
the polarizing beam combiner comprises a first surface at which the p-polarized light beams are received and a second surface at which the s-polarized light beams are received, wherein the polarizing beam combiner is configured to reflect the p-polarized light beams received at the first surface and transmit the s-polarized light beams received at the second surface, or reflect the s- polarized light beams received at the second surface and transmit the p- polarized light beams received at the first surface.

13. The image projection system of claim 11, wherein:
each of the first plurality of collimation lenses is arranged at a first minimum distance from a corresponding one of the first plurality of monochromatic transmitters; and
each of the second plurality of collimation lenses is arranged at a second minimum distance from a corresponding one of the second plurality of monochromatic transmitters, wherein the second minimum distance is different from the first minimum distance.

14. The image projection system of claim 11, wherein:
the first plurality of monochromatic transmitters include a first red light transmitter, a first blue light transmitter, and a first green light transmitter, and
the second plurality of monochromatic transmitters include a second red light transmitter, a second blue light transmitter, and a second green light transmitter.

15. The image projection system of claim 14, further comprising:
a first plurality of dichroic mirrors configured to direct the first polarized collimated light beams at the polarizing beam combiner; and
a second plurality of dichroic mirrors configured to direct the second polarized collimated light beams at the polarizing beam combiner.

16. The image projection system of claim 11, further comprising:
a further beam combiner arranged between the scanner and the eye, wherein the further beam combiner receives the first polarized collimated light beams and the second polarized collimated light beams and directs the first polarized collimated light beams and the second polarized collimated light beams onto the eye.

17. The image projection system of claim 11, wherein:
the first projection plane is projected to optical infinity, and
the second projection plane is projected at a predefined distance less than optical infinity.

18. The image projection system of claim 17, wherein optical infinity is equivalent to a virtual distance of at least 9.5 meters.

19. The image projection system of claim 11, wherein:
the first projection plane is projected at a first predefined distance, and
the second projection plane is projected at a second predefined distance different from the first predefined distance.

20. An image projection system, comprising:
a first plurality of monochromatic transmitters configured to transmit a first plurality of light beams corresponding to a plurality of projection planes that are perceived at different distances;
a first plurality of collimation lenses corresponding to the first plurality of monochromatic transmitters, wherein each of the first plurality of collimation lenses is configured to receive a corresponding light beam from a different one of the first plurality of monochromatic transmitters such that the first plurality of collimation lenses generate a first plurality of collimated light beams to be projected onto an eye to render a plurality of projection images, each to be perceived at a different one of the plurality of projection planes; and
a scanner configured to receive the first plurality of collimated light beams and steer the first plurality of collimated light beams according to a scanning pattern to render the plurality of projection images onto the eye.

21. The image projection system of claim 20, further comprising:
a second plurality of monochromatic transmitters configured to transmit a second plurality of light beams corresponding to the plurality of projection planes;
a second plurality of collimation lenses corresponding to the second plurality of monochromatic transmitters, wherein each of the second plurality of collimation lenses is configured to receive a corresponding light beam from a different one of the second plurality of monochromatic transmitters such that the second plurality of collimation lenses generate a second plurality of collimated light beams to be projected onto the eye to render the plurality of projection images, each to be perceived at a different one of the plurality of projection planes; and
a first beam combiner arranged at an intersection of the first plurality of collimated light beams and the second plurality of collimated light beams to direct the first plurality of collimated light beams and the second plurality of collimated light beams on a combined transmission path,
wherein the scanner is arranged on the combined transmission path to receive the first plurality of collimated light beams and the second plurality of collimated light beams and steer the first plurality of collimated light beams and the second plurality of collimated light beams according to the scanning pattern to render the plurality of projection images onto the eye.

22. The image projection system of claim 21, further comprising:
a third plurality of monochromatic transmitters configured to transmit a third plurality of light beams corresponding to the plurality of projection planes; and
a third plurality of collimation lenses corresponding to the third plurality of monochromatic transmitters, wherein each of the third plurality of collimation lenses is configured to receive a corresponding light beam from a different one of the third plurality of monochromatic transmitters such that the third plurality of collimation lenses generate a third plurality of collimated light beams to be projected onto the eye to render the plurality of projection images, each to be perceived at a different one of the plurality of projection planes; and
a second beam combiner arranged at an intersection of the first plurality of collimated light beams, the second plurality of collimated light beams, and the third plurality of collimated light beams to direct the first plurality of collimated light beams, the second plurality of collimated light beams, and the third plurality of collimated light beams on the combined transmission path, and
wherein the scanner is arranged on the combined transmission path to receive the first plurality of collimated light beams, the second plurality of collimated light beams, and the third plurality of collimated light beams and steer the first plurality of collimated light beams, the second plurality of collimated light beams, and the third plurality of collimated light beams according to the scanning pattern to render the plurality of projection images onto the eye.

23. The image projection system of claim 22, further comprising:
a first plurality of dichroic mirrors configured to direct the first plurality of collimated light beams at the first beam combiner;
a second plurality of dichroic mirrors configured to direct the second plurality of collimated light beams at the first beam combiner; and
a third plurality of dichroic mirrors configured to direct the third plurality of collimated light beams at the second beam combiner.

24. The image projection system of claim 23, wherein the second beam combiner is arranged on the combined transmission path between the first beam combiner and the scanner.

25. The image projection system of claim 22, wherein the first plurality of monochromatic transmitters are red light transmitters that transmit at different wavelengths with respect to each other, the second plurality of monochromatic transmitters are blue light transmitters that transmit at different wavelengths with respect to each other, and the third plurality of monochromatic transmitters are green light transmitters that transmit at different wavelengths with respect to each other.

26. The image projection system of claim 21, further comprising:
a first plurality of dichroic mirrors configured to direct the first plurality of collimated light beams at the first beam combiner; and
a second plurality of dichroic mirrors configured to direct the second plurality of collimated light beams at the first beam combiner.

27. The image projection system of claim 20, further comprising:
a first plurality of dichroic mirrors configured to direct the first plurality of collimated light beams on a same transmission path,
wherein the first plurality of monochromatic transmitters are configured to transmit substantially a same color of light at different wavelengths with respect to each other.

28. The image projection system of claim 20, wherein:
each of the first plurality of monochromatic transmitters is paired with one of the first plurality of collimation lenses to form a pair such that each pair is separated by a respective minimum distance corresponding to a different one of the plurality of projection planes with each respective minimum distance being different from each other.

29. The image projection system of claim 28, wherein:
each of the first plurality of collimation lenses is either fixed such that each respective minimum distance is fixed or movable such that each respective minimum distance is adjustable.

30. The image projection system of claim 20, wherein:
the plurality of projection planes includes a first projection plane that is projected to optical infinity and a second projection plane is projected at a predefined distance less than optical infinity.

31. The image projection system of claim 30, wherein optical infinity is equivalent to a virtual distance of at least 9.5 meters.

32. The image projection system of claim 20, wherein:
the plurality of projection planes includes a first projection plane that is projected at a first predefined distance and a second projection plane that is projected at a second predefined distance different from the first predefined distance.

* * * * *